(12) United States Patent
Lehtinen

(10) Patent No.: US 6,724,883 B1
(45) Date of Patent: Apr. 20, 2004

(54) PROCESSING OF DATA MESSAGE IN A NETWORK ELEMENT OF A COMMUNICATIONS NETWORK

(75) Inventor: Pekka Lehtinen, Jarvenpaa (FI)

(73) Assignee: Nokia Corporation, Espoo (FI)

( * ) Notice: Subject to any disclaimer, the term of this patent is extended or adjusted under 35 U.S.C. 154(b) by 764 days.

(21) Appl. No.: 09/660,133

(22) Filed: Sep. 12, 2000

Related U.S. Application Data

(63) Continuation of application No. PCT/FI99/00300, filed on Apr. 9, 1999.

(30) Foreign Application Priority Data

Apr. 9, 1998 (FI) .................................................. 980824

(51) Int. Cl.$^7$ ......................... H04M 3/42; H04M 7/00; G06F 9/44; H04Q 3/00
(52) U.S. Cl. ............. 379/230; 379/221.09; 379/221.14; 709/202; 709/223; 709/245; 709/246; 709/317
(58) Field of Search ....................... 379/201.12, 207.02, 379/221.08, 221.09, 221.14, 229, 230; 709/202, 223, 224, 245, 246, 317

(56) References Cited

U.S. PATENT DOCUMENTS

| 4,601,586 A | | 7/1986 | Bahr et al. .................. 709/206 |
| 5,574,782 A | | 11/1996 | Baird et al. ............. 379/221.09 |
| 5,878,113 A | * | 3/1999 | Bhusri ......................... 379/13 |
| 5,943,409 A | * | 8/1999 | Malik ..................... 379/209.01 |
| 5,974,252 A | * | 10/1999 | Lin et al. ..................... 717/108 |
| 6,330,598 B1 | * | 12/2001 | Beckwith et al. ........... 709/223 |

FOREIGN PATENT DOCUMENTS

| EP | 0405041 | 1/1991 | ........... H04L/12/00 |
| EP | 0272836 | 6/1998 | ............. G06F/9/46 |
| EP | 0886446 | 12/1998 | ............ H04Q/3/00 |
| WO | WO 99/09723 | 8/1997 | ........... H04L/29/00 |

OTHER PUBLICATIONS

International Search Report for PCT/FI99/00300.

\* cited by examiner

*Primary Examiner*—Harry S. Hong
(74) *Attorney, Agent, or Firm*—Squire, Sanders & Dempsey L.L.P.

(57) ABSTRACT

The invention relates to a method for processing a data message in a network element of a communications network and to a network element arrangement. In the communications network, messages whose structure is defined by means of a given description language, the message definition of an individual message type comprising several successive components, such as text rows, are sent to the network element. In order to make the processing of data relating to a message simpler than heretofore, an auxiliary parameter ($f\_xyA \ldots f\_xyF$) is tied to an individual component of the message definition of an individual message type, by means of which a value indicating whether the message part corresponding to said component is included in the message to be processed is maintained in the network element.

12 Claims, 7 Drawing Sheets

Fig. 8

- CHOICE    C
  - SEQUENCE    C
    - CHOICE    C
      - elemMsgID......Integer4    A1
      - SEQUENCE    C
        - textMsgContent............STR(1..255)    A1
        - textAttributes...............STR(1..2).........OPT    A2
      - SIZE(1...16)OF (elemMsgIDsList)    C
        - elemMsgIDs.....Integer4    A1
      - SEQUENCE    C
        - varMsgElemMsgID.....Integer4    A1
        - SIZE(1...5)OF (varVarPartList)    C
          - CHOICE    C
            - integer.....Integer4    A1
            - SEQ_NO_ASN1.............STR(2..26)    C
              - numEncodingSchemeINT(Bitsize3)    A1
              - numTypeOfDigits......INT(Bitsize5)    A1
              - numDigits... ..............BCD(1..25)    A1
            - time..............BCD(2)    A1
            - date.............BCD(3)    A1
            - price.............BCD(4)    A1
        - numOfRepet...INT(1..127)......  ............OPT    A2
        - iTSDuration....INT(0..32767)... ............OPT    A2
        - iTSIntv...........INT(0..32767)... ............OPT    A2
  - SEQUENCE    C
    - toneID...............Integer4    A1
    - toneDuration......Integer4.............OPT    A2
  - displayInfo...... ...................STR(1..80)    A1

PROCESSING OF DATA MESSAGE IN A NETWORK ELEMENT OF A COMMUNICATIONS NETWORK

This application is a continuation of international application serial number PCT/FI99/00300, filed Apr. 9, 1999.

FIELD OF THE INVENTION

The invention relates generally to processing of data messages in a network element of a communications network. An advantageous application environment of the invention is a network element in an intelligent network, such as an SCP network element, but the solution of the invention can be implemented in any network element in which data messages having a predetermined structure and comprising data structures within one another, some of said structures being optional, are received. These data messages can be for example messages used in common channel signalling. In the following, the invention will be described using an intelligent network environment by way of example.

BACKGROUND OF THE INVENTION

The rapid evolvement of the telecommunications field has afforded operators the capability of providing many different types of services to users. A network architecture that provides advanced services is called an intelligent network. The common abbreviation for intelligent network is IN.

The functional architecture of an intelligent network is shown in FIG. 1 where the functional entities of the network are shown as ovals. This architecture is described briefly below, because the invention will be described hereinafter with reference to the intelligent network environment.

The access of the end user (subscriber) to the network is handled by the CCAF (Call Control Agent Function). The access to the IN services is implemented by making additions to existing digital exchanges. This is done by using the basic call state model BCSM which describes the existing functionality used to process a call between two users. The BCSM is a high level state automation description of the call control functions CCF required for establishing and maintaining a connection route between users. Functionality is added to this state model by using the service switching function SSF (cf. the partial overlap of the entities CCF and SSF in FIG. 1) so that it is possible to decide when it is necessary to call the services of the intelligent network (the IN services). After these IN services have been called, the service control function SCF that contains the service logic for the intelligent network handles the service-related processing (of the call attempt). The service switching function SSF thereby connects the call control function CCF to the service control function SCF and allows the service control function SCF to control the call control function CCF. For example, SCF can request that the SSF/CCF perform specific call or connection functions, for example charging or routing operations. The SCF can also send requests to the service data function SDF which handles the access to the service-related data and network data of the intelligent network. The SCF can thus for example request the SDF to retrieve specific service-related data or update this data.

The functions described above are further complemented by the specialized resources function SRF which provides the special functions required for implementing some of the services provided by the intelligent network. Examples of these services are protocol conversions, speech recognition, voice mail, etc. The SCF can, for example, request the SSF/CCF functions to first establish a connection between the end users and SRF and then it can request the SRF to give voice announcements to the end users.

Other functional entities of the intelligent network are various functions that relate to control, such as the SCEF (Service Creation Environment Function), SMF (Service Management Function), and SMAF (Service Management Access Function). The SMF includes, among other things, service control, the SMAF provides the connection to the SMF, and the SCEF makes it possible to specify, develop, test and feed IN services via the SMF to the SCF. Because these functions only relate to the operation of the network operator, they are not shown in FIG. 1.

The role of the functional entities described in FIG. 1 as relating to the IN services will be briefly described below. The CCAF receives the service request given by the calling party. The service request usually consists of lifting the receiver and/or a series of digits dialled by the calling party. The CCAF further transmits the service request to the CCF/SSF for processing. The call control function CCF does not have the service data but it has been programmed to recognize the need of a service request. The CCF interrupts the call setup for a moment and notifies the service switching function SSF about the state of the call. The task of the SSF is, using predefined criteria, to interpret the service request and thus determine whether the request is a service request related to the IN services. If this is the case, the SSF composes a standardized IN service request and sends the request to the SCF along with information about the state of the service request. The SCF receives the request and decodes it. After that it cooperates with the SSF/CCF, SRF, and SDF to provide the requested service to the end user.

The physical level architecture of the intelligent network describes how the functional entities described above are located in the physical entities of the network. The physical architecture of the intelligent network is illustrated in FIG. 2, where the physical entities are described as rectangles or circles and functional entities as ovals. The signalling connections are described by dashed lines and the actual transport which is for example speech, by continuous lines. The optional functional entities are denoted with dashed line. The signalling network shown in the Figure is a network according to SS7 (Signalling System Number 7 is a well-known signalling system described in the CCITT (nowadays ITU-T) blue book *Specifications of Signalling System No. 7*, Melbourne 1988).

The subscribers equipment SE which can include, for example, a telephone, computer, or telefax, are connected either directly to a service switching point SSP or to a network access point NAP.

The service switching point SSP provides the user with access to the network and handles all necessary selection functions. The SSP can also detect any IN service requests. Functionally, the SSP includes the call control and service selection functions.

The network access point NAP is a traditional telephone exchange that includes the call control function CCF, for example, the Applicants' DX 220 exchange which can differentiate calls that require IN services from traditional calls and route the calls that require IN services to the appropriate SSP.

The service control point SCP includes the service logic programs SLP that are used to produce the IN services. The shorter term service program will also be used for service logic programs in the following.

The service data point SDP is a database containing customer and network data which is used by the service programs of the SCP to produce tailored services. The SCP can use SDP services directly via the signalling or data network.

The intelligent peripheral IP provides special services, such as announcements and voice and multiple choice recognition.

The service switching and control point SSCP consists of an SCP and SSP located in the same network element (in other words, if the SSP network element shown in the drawing contains both an SCF and an SSF entity, the network element in question is an SSCP).

The tasks of a service management system SMP include the management of the database (SDP), network monitoring and testing, and collecting network data. It can connect to all other physical entities.

The service creation environment point SCEP is used for specifying, developing and testing the IN services, and for entering the services in SMP.

The service adjunct AD is functionally equivalent to the service control point SCP, but it is directly connected to SSP with a fast data connection (for example, with an ISDN 30B+D connection) instead of via the common channel signalling network SS7.

The service node SN can control the IN services and perform data transfers with users. It communicates directly with one or more SSPs.

The service management access point SMAP is a physical entity which provides certain users with a connection to SMP.

A separate assisting SCP can also be associated with the SCP network element. For example a service provider can have this assisting SCP network element for maintaining a subscriber-specific number translation logic or a subscriber-specific routing logic, for example, said logic being offered to the SCP network element of the network operator for replenishing the control data therein.

The above is a brief description of the intelligent network as a background to the description of the method according to the invention. The interested reader can get a more detailed description of the intelligent network in, for example, ITU-T specifications Q.121X or in the AIN specifications of Bellcore.

An INAP (Intelligent Network Application Part) message set is used between an SSP and SCP, for example. (The message set is described e.g. in the standard ETSI IN CS1 INAP Part 1: Protocol Specification, Draft prETS 300 374-1, November 1993, to which the interested reader is referred for a more detailed exposition.) No actual protocol has been defined in the standards, only the messages employed, some of which are used in one transmission direction and some in the other. In addition to fixed and optional para-meters, also so called extension parameters have been defined in the messages. Hence, the different service logic programs may use messages of the same INAP message set, but in a different order and with different parameter values. The actual protocol level in the communication between the SSP and SCP is thus represented by these different service logic programs. Each service logic program sends to and receives from the network INAP messages.

All these INAP messages have been defined using the ASN.1 definition language. ASN.1 (Abstract Syntax Notation 1) is a description language commonly used in the telecommunications field, by means of which data structures are defined and encoded. The definition is regenerative, which means that any data element within any data structure can have as complex a structure as a data structure on an upper level.

When such data messages are received for example in an SCP network element of an intelligent network, only those parameters for which new values were provided in the received message are updated in the network element. When processing relating to provisioning of service is effected in the SCP network element on the basis of the received message, it must be checked in the service program which of the parameters contained in the message definition of the received message were included in the actual received data message (and which had been omitted at the transmitting end). This check is at present quite complicated, as the inclusion of a given parameter in the message is also dependent on whether the (outer) data structures surrounding said parameter are included in the message. Hence, the manner of checking for the presence of a parameter is dependent, except on what kind of row precedes said parameter (i.e., is the header) in the message definition of the received message, also on total structure of the message in question up to the point where said parameter is located according to the message definition. Checking for the presence of one parameter may thus comprise several successive checks, and moreover the parameters of messages of different types have different checking methods depending on the structure of each message type. This complex method of checking has been reached partly also for the reason that no "empty" value directly indicating that a given parameter is not included in the processed message can be defined for the parameters.

SUMMARY OF THE INVENTION

It is an object of the invention to eliminate the above drawback and to provide a solution wherewith processing of the data content of data messages arriving at a network element and departing therefrom can be made simpler and faster than heretofore.

This object is achieved with the solution in accordance with the invention, which is defined in the independent claims.

The idea of the invention is to use auxiliary parameters for individual components (text rows in the ASN.1 definition) of the message definition, the values of the auxiliary parameters indicating whether the parameter (or data structure) corresponding to that component is included in the message. By means of the auxiliary parameters, complete information on the actual content of the message received or being sent is produced. Furthermore, this information is such that information on the presence of a given parameter is obtained by one comparison by checking the value of the auxiliary parameter specific to said parameter.

On account of the solution in accordance with the invention, a significant relief is achieved in the processing relating to data messages, as the presence of parameters can be checked in the network element without any need to construct, within the program carrying out the check, separately for each parameter a logic in which the total structure of said message type up to the location of said parameter has been taken into account.

BRIEF DESCRIPTION OF THE DRAWINGS

In the following, the invention and its preferred embodiments will be described in greater detail with reference to examples in accordance with the attached FIGS. 3 . . . 10 in the accompanying drawings, in which FIG. 8 shows an example of the ASN.1 definition of a data message.

DETAILED DESCRIPTION OF THE INVENTION

When a network subscriber initiates a call, the terminal exchange of the subscriber first receives information on the calling subscriber's desire to place a call. This information can arrive at the exchange for example as a Setup message in accordance with standard Q.931. If the terminal exchange is not an SSP exchange, it can route the call attempt to an SSP exchange.

When the call control of the SSP exchange detects that a subscriber is concerned who needs IN services, transfer of the control to the IN is triggered and processing of the call attempt is "frozen". The SSP exchange then sends to the SCP an Initial_DP message, which is a standard message between the SSF and SCP, generated by the SSF upon detecting at any detection point of the call state model that a service request is necessary (a detection point is a point in the call state model at which the control can be transferred to the IN). Initial_DP is thus the message that starts the dialog between the SSP and the SCP relating to the provision of each service. The information elements included in the message by the SSP exchange include at least the calling and called number and a service key.

Figure 3:
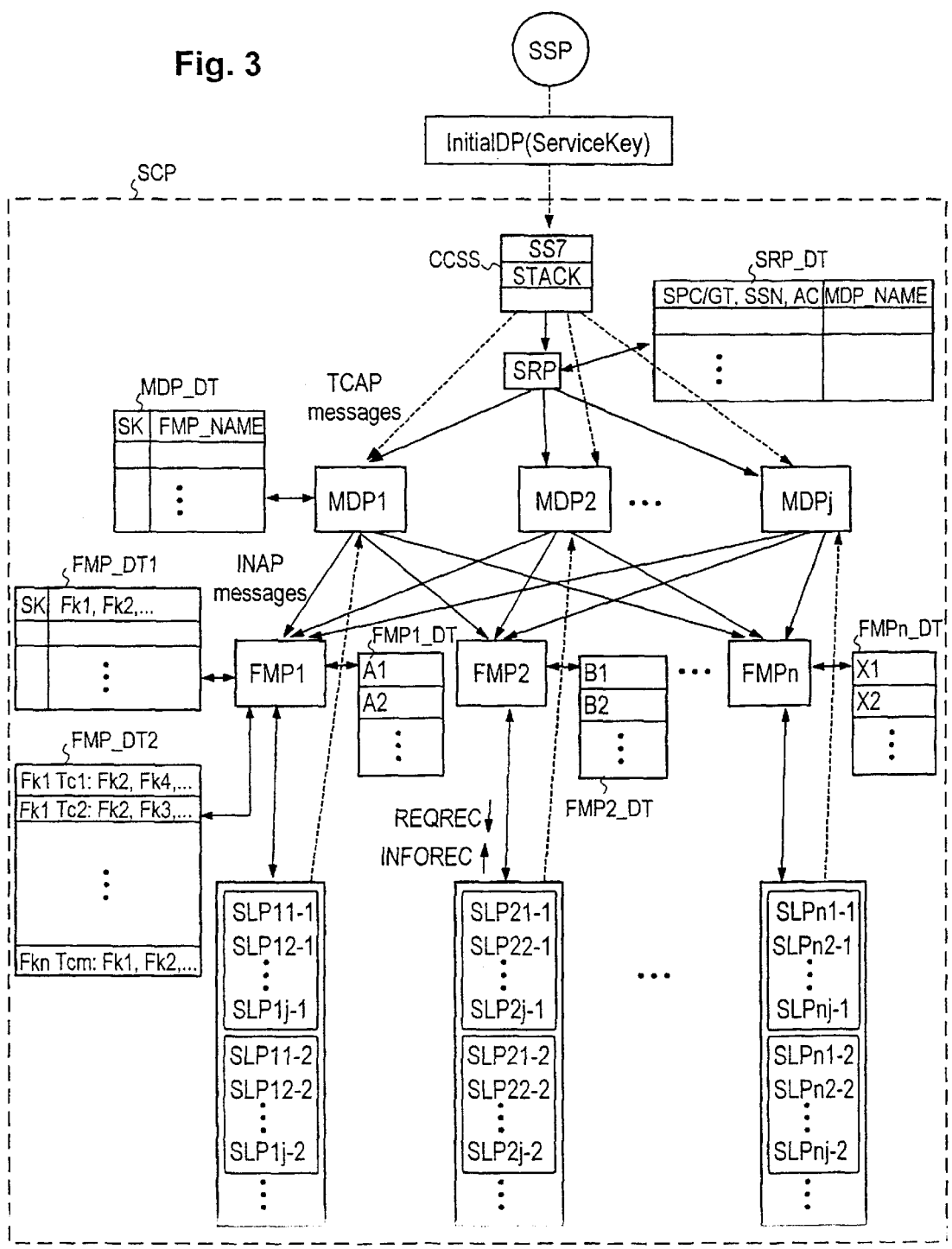
FIG. 3 illustrates the functional architecture of an SCP network element in accordance with the invention when parts essential to the service logic software are looked at, FIG. 4 illustrates the content of an object-related data row.

FIG. 3 illustrates the functional architecture of an SCP network element in accordance with the invention seen from the point of view of the service programs. The service requests arriving at the network element come through a common channel signalling stack CCSS to the receiving program block SRP (SS7 Receiver Program). One such receiving program block is provided for each common channel signalling stack of the SCP network element. For simplicity, the example of the figure only shows one stack and one receiving program block.

If one SCP network element is connected to more than one SSP network element in which different versions of the INAP message set are used, the definition of the data content of the data messages received by the SCP is different depending on which SSP the SCP is communicating with. For this reason, further processing of the messages from the receiving program block onwards must in practice be differentiated in accordance with which INAP message set is concerned. On the other hand, the receiving program block SRP is independent of the INAP message set employed.

The receiving program block SRP receives from the network (from SSF entities) standard TC_BEGIN messages. The task of the program block is to identify the relevant INAP message set version on the basis of the TC_BEGIN message and to forward the INAP messages contained in the component primitives further to the message distributor program block MDPi corresponding to said message set, wherein i=1,2, . . . j and j is the number of different INAP message sets used.

Hence, at the level next to the receiving program block the network architecture includes program blocks MDPi (i=1, . . . j), one for each INAP message set used. Each distributor program MDPi receives TCAP messages from the network and forwards INAP messages, receives INAP messages from the service logic programs, and sends TCAP messages to the network. (A TCAP message comprises a header and one or more component primitives. Each component primitive can contain one INAP message at most. Each component primitive also has a subheader of its own. All of these header parts are produced when messages are sent to the network and they are removed when messages are received from the network.)

When an initiation request for a service dialog—which arrives as a TC_BEGIN primitive (containing an Initial_DP message)—is received on a network element, a new instance of the receiving program SRP is created that will search the correct distributor program block, create an instance thereof for the use of said service request, and transmit a TCAP message to said instance. Thereafter the instance of the receiving program block is deleted. The distributor program instance receives all TCAP messages subsequently arriving from SSP. The search for the correct distributor program takes place in such a way that the receiving program block SRP reads from the header of the TC_BEGIN message either the identifier of the sending SSP network element (SPC, Signalling Point Code, or GT, Global Title) and additionally the identifier of the subsystem (SSN, SubSystem Number), or alternatively the relevant application context identifier AC, and searches on the basis thereof from the data table SRP_DT of the SRP level the name of the distributor program, MDP_NAME, corresponding to the INAP message set in question.

Thus, the architecture of the SCP exchange includes for each INAP message set a dedicated program block MDPi, the task of which is to decode the received messages (at least the Initial_DP message containing the service key parameter) and to distribute the messages to their correct receivers.

In the functional hierarchy of the network element, the main program blocks are located at the next hierarchy level after the distributor programs. These main program blocks are denoted by FMPi (Feature Manager Program). The main program blocks constitute the processes controlling the actual service logic programs SLP, supplying them with the data they need. Thus, the main program blocks are responsible for managing the services and features. (A subservice, for which the above term "service feature" is employed in the international standards, will also be termed "feature" in the present context. A service feature is the (smallest) component visible to the customer or subscriber that the service obtained by him/her comprises.)

The message distributor programs distribute each service request to the correct main program block. To enable this, there is a dedicated data table MDP_DT for the distributor programs, in which the service key value SK is presented at the beginning of each data row as a search key. On the basis of the service key value that arrived in the Initial_DP message, the distributor program block searches from the data table the correct row in which it finds the identifier of the main program block (FMP_NAME) that serves as the recipient in the case of said service key value. The data table is preferably common to all distributor program blocks MDPi. Having found the correct main program block, the distributor block instance creates therefrom an instance for the use of said service request and forwards an INAP message to said instance.

Since service logic needs are different for different object types, it is advantageous to implement the SCP network element in such a way that it has separate main program blocks for the logically distinct main object classes contained in the SSP exchanges. Said classes may include calling subscriber class, called subscriber class, destinations (beginning of dialled number), sub-destination (the entire dialed number), routes, circuit groups, etc. Furthermore, the subscribers may be in different classes according to which network they belong to (for example a fixed network or mobile network). Objects in this context denote such network-related entities to which information can be attached in the network element—e.g. in the case of an intelligent network in an SSP network element—indicating, for an individual call attempt, whether a service request is to be sent to the network element offering services (which in the case of an intelligent network is an SCP network element).

As stated previously, each distributor program block utilizes the service key parameter that arrived in the service request message to define the receiving main program block. This means that for service requests relating to a given main object class (e.g. calling subscribers), the SSP exchange has to set a service key value that is different from the service key value of objects belonging to another class (e.g. called subscribers) (even though service of the same type is concerned). A wide variety of service key values may correspond to a given main program block, but the service key value sets relating to two different main programs may not overlap.

Each main object class has a dedicated data table FMPi_DT (i=1,2, . . . n). These data tables will be termed main tables in the following. Thus, the SCP network element has a dedicated main table for each main program block. Each main table has one data row for each object belonging to said class. For example, the data table (FMP1_DT) used by the main program block FMP1 relating to calling subscribers has one data row for each calling subscriber Ai (i=1,2, . . . ), the data table (FMP2_DT) used by the main program FMP2 relating to called subscribers has one data row for each called subscriber Bi (i=1, 2 . . . ), the data table used by the main program relating to subdestination objects has one data row for each subdestination in use, the data table used by the main program relating to destination objects has one data row for each destination in use, etc.

Figure 1:
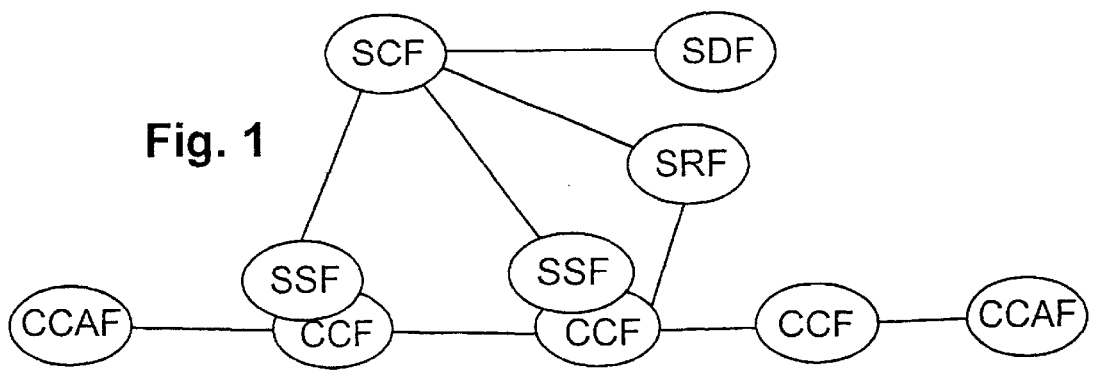
FIG. 1 illustrates the functional architecture of an intelligent network.
Figure 4:
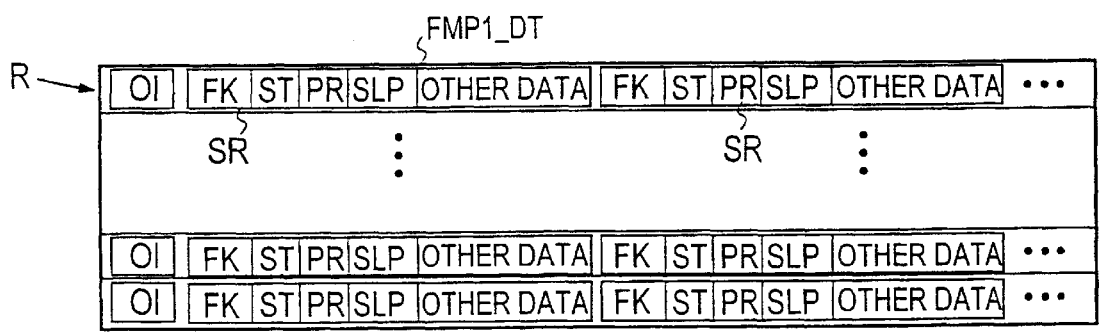

In each row of the main tables, information is stored in the manner shown in FIG. 4, defining what kind of feature set said object has activated. An object identifier Ol is stored at the beginning of each row R as a search key. The main program block searches the correct row from its data table by means of the value of the object identifier contained in the INAP message. The row contains successive subrecords SR, one for each feature. At the beginning of each subrecord, there is a field FK containing a feature key Fk1 i=1,2 . . . ), indicating which feature is concerned. Thereafter the subrecord may have for example a status field ST, containing information on whether said feature is active or passive, and a priority field PR, containing a priority number. These priority numbers of subrecords indicate the relative order of execution of the features. Each subrecord further has at least field SLP, containing the identifier of the service logic program that executes said feature. The service logic programs form the lowest hierarchy level of the network element.

Preferably there are dedicated service programs for each main object class. Furthermore, there is a clone of each program dedicated to each INAP message set (i.e., each distributor program). In the figure, the service programs are denoted with reference SLPxy-z, where x indicates the main object class to which the program belongs, y indicates the INAP message set to which the program belongs, and z indicates the consecutive number of the program within the main object class.

In accordance with the hierarchy of the network element, the instance (SLPi) of the lowest level of one service request dialog is called a child, the instance of the next level (FMPi) is called the parent, and the instance (MDPi) of the level next to that is called the grandparent. An older instance always begets the younger instance.

In practice, one feature implemented by a service logic program may be for example playing of an announcement to the subscriber ("play an announcement") or an operation by which the calling subscriber is requested to dial additional numbers ("prompt and collect user information"), or a connect operation (a CONNECT message is sent to the SSP exchange, by which the SSP exchange is requested to connect the call to a given address).

The order of execution of the features can be indicated for example in the above-stated manner by adding a priority number field PR to the subrecords, in which case said numbers indicate the relative order of execution of the features. There are also other alternatives for achieving the correct order of execution, as will be seen hereinafter. This way, however, is simple and makes it possible that the same service key value can indicate a different order of execution e.g. for two different calling subscribers.

In addition, one or more separate data tables are provided for the main program blocks, having a data row for each service key value that is in use in the domain of several different main program blocks. The example in the figure has one data table FMP_DT1 that is common to all program blocks (all main program blocks read said data table). At the beginning of each data row in the data table, the service key value SK is provided as the key. Each row contains data on the features Fki (i=1,2 . . . ) relating to said service key value, that is, on the services that are allowable features in the case of said service key value. Furthermore, the row may contain information as to in which order these features are executed, or the order of the feature keys may directly indicate the relative order of the features. The main program block reads from this data table the row corresponding to the received service key value, whereby it finds the set of features that are allowable features in the case of said value. Thereafter the main program block reads from its dedicated data table FMPi_DT (i=1,2 . . . ) the row corresponding to the identifier of said object (e.g. calling subscriber). From this row, the main program block finds the identifier of the service logic program SLPi (i=1,2 . . . ) that is to be started. From the row of the class-specific table FMPi_DT (for instance the table of calling subscribers), the main program block takes into consideration only those features which relate to said service key value (i.e. the ones belonging to the allowable set searched above), and of these eventually only those indicated as active at said object.

At this stage of execution of the service request, the features relating to the object and their relative order of execution are known. Thereafter the main program block produces an instance of the service logic program corresponding to the feature that is the first in turn and requests it to start execution of the service.

The FMP instance thus sends an Initial_DP message to the service program which has the highest priority and whose identifier the main program block read from the relevant subrecord of the object-related row. First, however, a separate request message REQREC is sent to said SLP instance, since the Initial_DP message must be sent in its standard format (ASN.1 format) in which its information content is not sufficient. The service logic program thus needs also other data in addition to that contained in the INAP message, for example the value of the feature key, which it receives in the request message.

Figure 5:
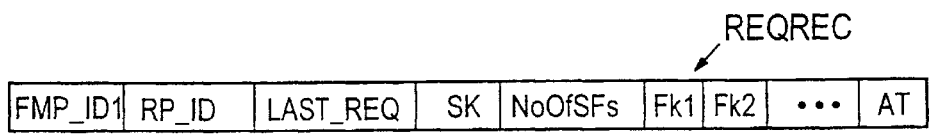
FIG. 5 shows the structure of a request message sent to a service program instance.

FIG. 5 shows an example of the data structure of the request message sent. The request message first has a field FMP_ID1, containing the identifier of the FMP instance. Thereafter follows a field RP_ID, containing the identifier of the program block to which the SLP should send its messages relating to this dialog. These acknowledgement messages can be sent both to the FMP instance (parent) and the MDP instance (grandparent). By sending acknowledgement messages to the distributor program instance, the load on the main program blocks can be diminished, since the MDP instance attends to the sending of outbound messages to the network in any case. The next field LAST_REQ contains a Boolean variable indicating whether still another request message is bound for the SLP instance after it has executed the features which were requested in that request message. The field SK contains the service key value obtained from the SSP network element. The next field, NoOfSFs, indicates the number of features contained in the request message, and the fields Fki (i=1,2 . . . ) subsequent to said field contain the keys of said features. The last field AT contains a description of how the service dialog is to be terminated if the execution of the features fails.

The structure of the service programs is such that they are composed of parts each of which executes a given feature. Thus each SLP executes only those features whose feature keys arrive in the request message. If more than one feature belonging to the allowable features is active in the object-related row and the same SLP identifier is related to all said features, the FMP can send all these feature keys in one request message (providing that it is otherwise allowable to execute all said features in succession). If the features contain the identifier of several different SLP programs, the FMP instance sends request messages to said SLP programs in the order indicated by the subrecords in the object-related row. The procedure may also be such that only one feature key is sent in one request message.

Having executed the feature, the SLP sends an acknowledgement message INFOREC to those elements (parent and/or grandparent) which are indicated in the request message REQREC. In the acknowledgement message, the SLP instance also indicates in what manner the feature was terminated. If, for example, the execution of the feature fails, the feature to be executed next can be different compared to a normal case in which the execution of the feature is successful.

Figure 6:
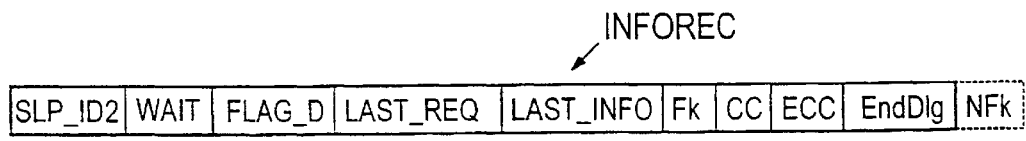
FIG. 6 depicts the structure of an acknowledgement message sent by the service program instance.
Figure 2:
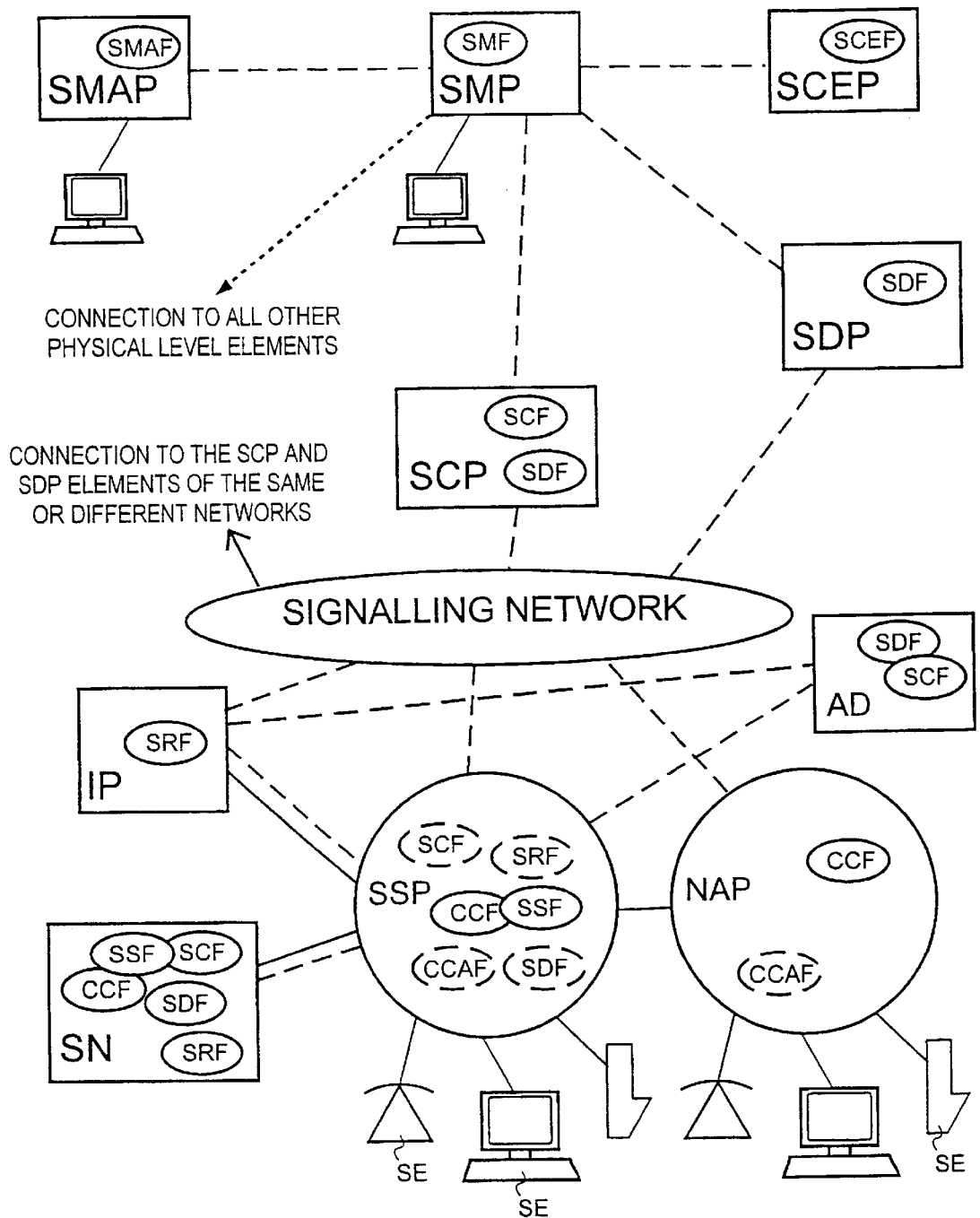
FIG. 2 illustrates the physical architecture of an intelligent network.

FIG. 6 illustrates one possible structure of an acknowledgement message INFOREC sent by an SLP instance. The first field SLP_ID2 indicates the identifier of the sending SLP instance. The next field WAIT contains for example information on whether a response is awaited from the network before the service can be continued. The field FLAG_D contains a Boolean variable indicating whether the SLP instance terminates itself after sending of an acknowledgement message or not. The field LAST_REQ again contains the same information that the child has last received from the parent in said field (the grandparent thus also receives said information). The next field LAST_INFO again contains a Boolean variable indicating whether the SLP instance has completed the last feature of the request message it received. The next field Fk contains the key of the feature in which said message arrives as an acknowledgement. The field CC contains the termination code of the feature just completed. The field ECC can indicate slight errors for which a separate error message need not be sent. The field EndDIg contains information on in which way said SLP instance desires its grandparent to terminate said dialog. The dialog can have different ways of termination, for example depending on whether a message is desired to be sent to the network, or if a message is sent, what information elements are included in the TC_END primitive to be sent.

The acknowledgement message can further contain a field NFk, in which the key of the feature that should be executed next can be indicated.

Since the internal messaging within the network element does not relate to the actual invention, it will not be described in detail in this context. Generally speaking, is can be stated that the service program instances receive both internal messages and messages arriving from the network (INAP messages), that the (internal) request and acknowledgement messages are used to attend to the execution and concatenation of the features, and that the acknowledgement message can also be used to indicate how the execution of the feature succeeded and possibly also which feature is to be executed next.

Figure 7:
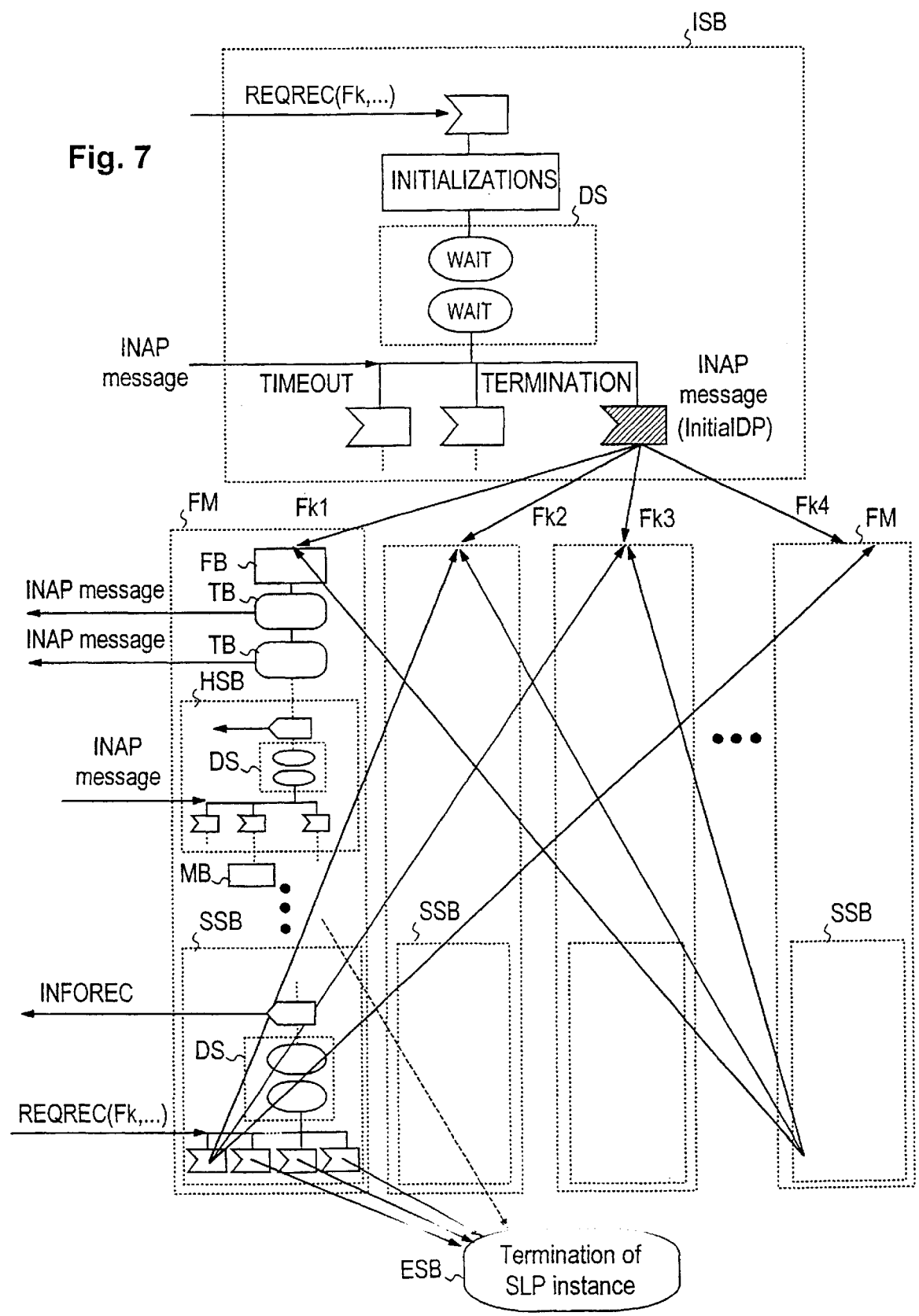
FIG. 7 illustrates the functional configuration of one service program.

In the following, the basic configuration of one service logic program SLPi will be described with reference to FIG. 7. Each SLP comprises an initial state block ISB (i.e., an initial state SIB), one or more feature modules FM, and an end state bock ESB (end state SIB). SIBs (Service Independent Building Blocks) are blocks from which service designers assemble service features and services. A SIB is the smallest block from which services and service features are assembled. A service consists of several service features and a service feature again consists of several SIBs, even though in some case a service feature may consist of only one SIB.

There are typically several parallel feature modules, but the initial state block and end state block are common to all parallel feature modules of a service program. Of these blocks, the term state block is used, on the one hand because they contain a delay state in which a response from the outside is expected and on the other hand because the service programs do not elsewhere contain such delay states in which an event is awaited.

Each SLP starts with a generic initial state block ISB the task of which is to receive the service dialog initiation message arriving from the network and to direct the execution of the service to the start of the correct feature. The sending main program block sends a request message REQREC (containing, in accordance with the above, for example one or more feature keys Fk) and the related actual INAP message (that has arrived from the network) in succession. For this reason, the initial block has a delay state DS in which the SLP instance awaits after the request message the related Initial_DP message. When the Initial_DP message arrives, the execution of the program branches off to one of the feature modules FM in accordance with the key of the feature to be executed first. The initial state block further performs various initialization tasks that are the same for all service programs. Under the delay state DS the service logic also needs at least a branch for processing a timeout message possibly received, indicating that the INAP message has been awaited for too long, and a branch for processing a termination message internal to the network element, by means of which the execution of the service is terminated for example on account of an error. During the execution of the service, the network element may also receive from the network an error message relating to said service dialog, as a result of which the service has to be terminated. In these error situations, the routine enters the end state block ESB directly.

After receipt of the InitialDP message in the initial state block, the service proceeds to one of the feature modules FM. The start of a feature normally comprises a function block FB in which the information contained in the initiation message is processed.

The execution of the service logic employs a dedicated messaging block TB (messaging SIB) for each message of different types that is sent from the service program to the network. In general, the function block at the start of the feature is succeeded by one or more of such messaging blocks TB. The purpose of the function block preceding the messaging blocks for its part is to prepare the data that is set in the information fields of the messages in the messaging blocks.

If any one of the messaging blocks is such that a specific response that is always received for said message in the case of faultless operation is awaited to said type of message, a generic halt state block HSB is added after the messaging block, in which the service logic awaits the response expected by the service logic (an INAP message of said type) from the network. Genericity means that the code used to implement the block is the same irrespective of at which point of the service program or in which service program the block is located. Only the variable given as entry information to the block, indicating the type of message awaited, is block-specific, since it is dependent on the type of the message sent to the network previously.

Some of the messages sent are such that they always receive a response message in connection with normal (faultless) operation, and one must await the response prior to proceeding with the execution of the service. Such response messages will be termed synchronous responses in the following. Some of the messages sent for their part are such that the execution of the service logic is continued without awaiting a response. When such responses arrive from the network on the SCP network element, the service program receives them in any suitable delay state, even though it is not awaiting in a specific halt state. Such response messages will be termed asynchronous responses. Some of the messages sent for their part are such that no response message to them arrives. Asynchronous messages also include error messages from the network, which can arrive at any time, and additionally such internal messages that can arrive at any time, for example internal termination messages. Each halt state block instance is capable of receiving, during waiting, any asynchronous response (possibly) arriving prior to a synchronous response.

Each feature module FM can contain one or more halt state blocks (and each halt state block can have one delay state in which a response is awaited).

Each instance of the halt state block is thus capable of receiving all possible messages that may arrive during the halt state. For this reason, the service logic must branch off at the end of the halt state block according to the type of the message recieved in the halt state. Consequently, it is possible to use in each such receiving branch a generic message preprocessing block MB, containing the functions that transfer the information received in the message to the use of the service program. In other words, in the preprocessing block the values of the parameters received in the message are transferred to the corresponding variables. One such preprocessing block is provided for each message type.

Furthermore, at the end of each feature module FM there is always a separate stop state block SSB, which indicates the end of a given feature before the start of the next feature or before the termination of the SLP instance. An acknowledgement message INFOREC is sent from the stop state block about the execution of the feature. On the basis of the termination code Tc contained in the acknowledgement message (in field CC), the main program block may e.g. define the next feature module and send to the stop state block the next request message REQREC, which contains the keys Fk of the features to be executed next (one or more keys). Hence, at the end of the stop state block a (new) feature key acts as a branching variable. From the point of view of the service logic, the stop state block thus serves as a switch that switches the service to proceed at the correct feature module.

When there are no features to be executed and it is not necessary to await asynchronous responses, the process jumps to the generic end state block ESB, in which suitable termination messages can be sent to the network and for example storage operations for various counters can be performed and the SLP instance can be terminated. The end state block comprises the termination operations that are common to all services.

The above is a description of a preferred embodiment of the SCP network element from the point of view of service logic programs transmitting and receiving data messages. Such a network element has also been disclosed in Finnish Patent Applications 980238 . . . 980242, which are not available to the public at the time of filing of the present application. In the following, the message processing by the service programs will be described in closer detail from the point of view of the invention.

FIG. 8 illustrates by way of example the possible format of the ASN.1 definition of a message to be received by or sent from a service program instance. In this exemplary case, part of an INAP message called PlayAnnouncementArg is concerned. The type or transmission direction of the message are no essential, however, as the ASN.1 definition is similar for all messages.

The ASN.1 definitions of INAP messages comprise text rows that can be divided into three different classes so that the first class comprises the text rows for the actual parameters, the second class comprises the text rows indicating ASN.1 data structures embedded in the message, and the third class comprises the text rows that do not fall into either of the above classes. Text rows of this class will be termed text rows of auxiliary parameters in the following.

There are three different types of rows of the first class—which contain an actual parameter—as follows:

1. Rows containing only a parameter name. Such rows are denoted in FIG. 8 with A1 at the end of the row.

2. Rows containing, in addition to the parameter name, an additional definition "OPT", which means that said parameter is optional (i.e., the parameter either exists or does not exist). These rows are denoted in FIG. 8 with A2 at the end of the row.

3. Rows containing, in addition to the parameter name, the notation "DEF", which means that said parameter is optional in such a way that if the parameter is missing from the message, a default value for said parameter is used. There are no such rows in the example of FIG. 8.

There are the following kinds of rows belonging to the second class, indicating an ASN.1 data structure (parameter set) embedded in the message (this embedded data structure is provided with a specific name):

4. "ANY DEFINED BY"
5. "STR DEFINED BY"
6. "STR DEFINED BY OPT"

A row of the type "ANY DEFINED BY" precedes a separate ASN.1 data structure (parameter set) selected from among several data structure candidates. A row of the type "STR DEFINED BY" precedes a separate ASN.1 data structure which is in string type data format. The same applies to the row according to item 6, but in this case the inclusion of the data structure in the message is optional (i.e. it either is or is not included in the message). The example of FIG. 8 shows no text rows belonging to the second class.

Text rows belonging to the third class are of the following type:

7. "CHOICE"
8. "CHOICE OPT"
9. "SEQUENCE"
10. "SEQUENCE OPT"
11. "SEQNOASN1"
12. "SEQNOASN1 OPT"
13. "SIZE(1 . . . N) OF"
14. "SIZE(1 . . . N) OF OPT"

A row of the type "CHOICE" is the header for a set of one or more separate data structures in the message definition. The incoming message data field corresponding to this row contains an integer indicating which of the data structures that follow in the message definition are included in the message. In the case of a row of the type "CHOICE OPT", one data structure is included or all have been omitted. The data field corresponding to a row of the type "SEQUENCE" does not contain any integer but merely names the data structure succeeding said row, comprising a set of data structures that may be of any ASN.1 data type. In the case of a row of the type "SEQUENCE OPT", the inclusion of this set in the message is optional. A row of the type "SEQNOASN1" is a header for a data structure comprising a set of data structures that are not ASN.1 structured data. The same applies to a row of the type "SEQNOASN1 OPT", but in this case the inclusion of said set in the message is optional. A row of the type "SIZE(1 . . . N)OF" in the message definition precedes a data structure comprising an ordered set of data structures which are of the same data type and whose number is at least one and N at most. In the case of a row of the type "SIZE(1 . . . N) OF OPT", the inclusion of this organized set in the message is optional. At this row, the message has an integer indicating how many times the data structure is repeated in the message.

Text rows belonging to the third class are denoted in FIG. 8 with a C at the end of the row.

Thus, 14 text rows of different types can be found in the ASN.1 definitions of INAP messages. The text rows of auxiliary parameters (class 3) and text rows of embedded ASN.1 data structures (class 2) can be considered as a kind of header rows that constitute rows between the actual parameters, each of which indicates something of the succeeding parameters or data structures (for example whether said parameters or data structures are included in the message or not).

As appears from the above, an individual parameter or set of parameters can be missing from a message even though said parameter or set of parameters were not optional, if the outer data structure is optional instead. Hence, the inclusion of parameters or data structures in a message is dependent on whether the surrounding data structures are included in the message.

The service logic programs of SCP network elements use parameter sets one of which is provided for each INAP message type. A set relating to one message type comprises one parameter for each text row containing an actual parameter in the ASN.1 definition of said message type (i.e., one parameter for each text row of class 1). When an INAP message is received the parameters that were included in the message are updated.

In accordance with the invention, the SCP network element uses a dedicated set of auxiliary parameters for each INAP message in addition to the above parameters. Each set preferably includes an auxiliary parameter for each text row present in the ASN.1 definition of said message. In the present description, the name f_OCshortname is used for the auxiliary parameters, where OC is the code indicating the type of said INAP message (Operation Code) and shortname is the brief name present in the text row of said message. An unabbreviated name (long name) relating to said text row can also be used to distinguish all auxiliary parameters from one another. Both a short and a long name have been given for the text row in the message definition of each message (which is also termed attribute) in the definition stage. A long name has many parts and the number of parts indicates at which internal level said text row is located within the message (cf. the indentations in FIG. 8 in which rows at the same level have been indicated with similar circles that are white at every other level and black at every other level). For example the short name PlaAAinfTS and the long name PlayAnnouncementArg.informationToSend pertain to the first row of FIG. 8, and the short name PlaAAinfTSinb and the long name PlayAnnouncementArg.informationToSend.<inbandinfo> pertain to the second row. Correspondingly, the names i_OCshortname and o_Ocshortname are used for the parameters, where the initial letter i relates to an incoming message and the initial letter o to an outgoing message.

When an INAP message defined in the above manner arrives from the network in the SCP network element, the message preprocessing block MB (cf. FIG. 7) transfers the information that arrived in the message to the use of service program instances and updates for the auxiliary parameters values indicating whether the parameter or data structure corresponding to said text row was included in the message. Before the information received in the message is transferred to the use of the service programs, the auxiliary parameter corresponding to each text row in the ASN.1 definition of said message is initialized to a given initialization value, e.g. zero at the beginning of the message preprocessing block. Likewise, the auxiliary parameter corresponding to each text row in the ASN.1 definition of the message sent is initialized at the end of the messaging block.

Figure 9:
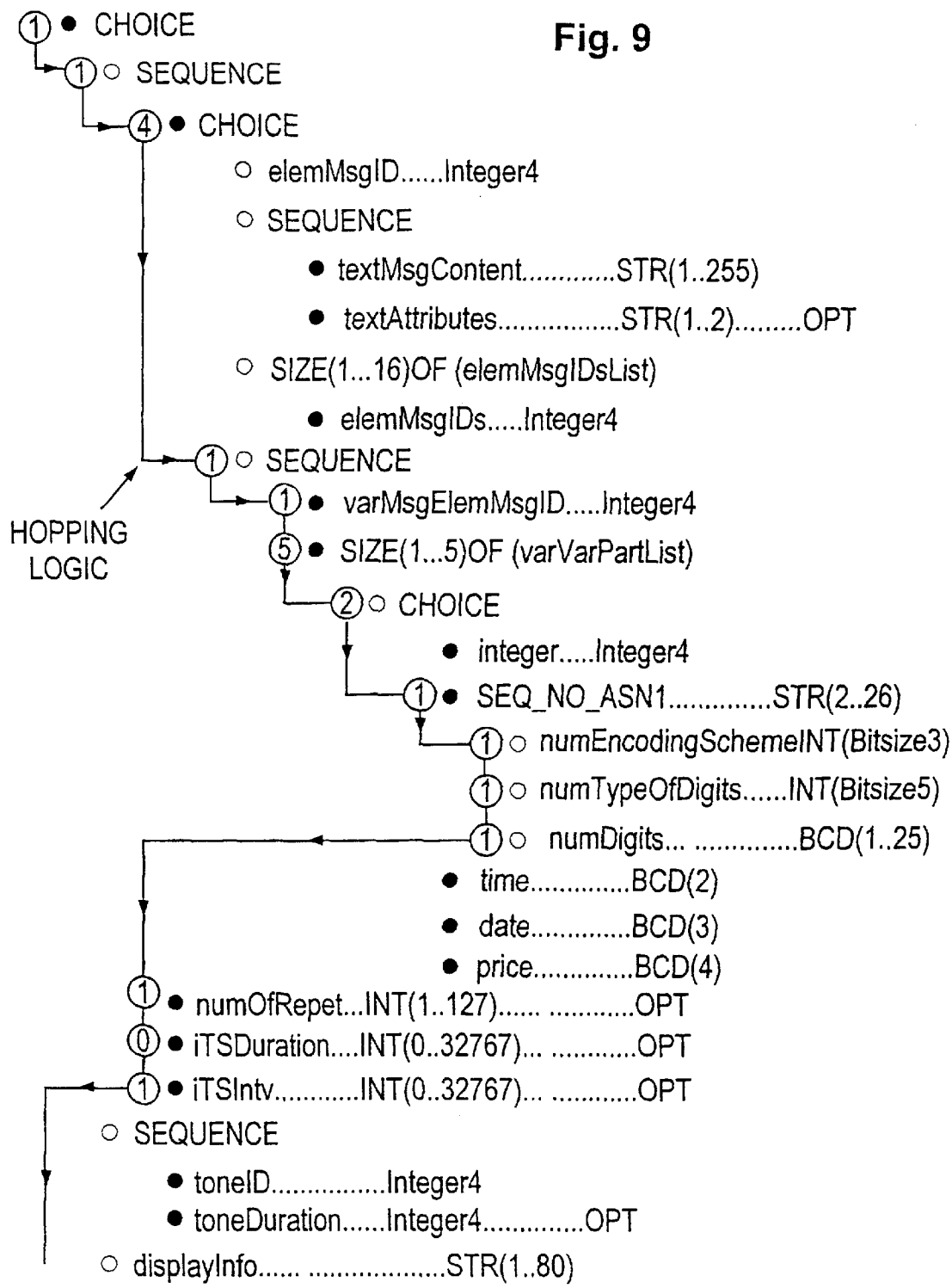
FIG. 9 illustrates the reading process of the data content of a message when a message defined in accordance with FIG. 8 has been received in the network element.

FIG. 9 illustrates updating of auxiliary parameters in connection with message reading in an exemplary case involving a message in accordance with FIG. 8. The exemplary values that are given to the auxiliary parameters in connection with the reading process are denoted by circled numbers in the figure. The arrows connecting the circles illustrate the proceeding of the reading and updating process, i.e. the "hopping logic". The message preprocessing block MB reads the content of the INAP message from a buffer in the order in accordance with the message definition, as the data is in this order in the message. The data corresponding to the text rows of the message definition is thus in the same order in the message and the message definition, and the message contains information on what parts corresponding to the text rows are included in the message. The hopping logic proceeds row by row but skips those rows for which the related data is not included in the message. At each row that the hopping logic hits, the auxiliary parameter corresponding to that row is updated, but as to the rows that have been hit, the actual parameter is updated only at rows belonging to class 1.

As stated previously, the message preprocessing block initializes all auxiliary parameters to zero before the incoming message is read out from the buffer. When the content of the message is read, these initialization values of the auxiliary parameters corresponding to the rows that the hopping logic hits are updated. For these auxiliary parameters, the initialization value is generally updated to an integer greater than zero (even though it can also be updated to zero anew).

For most text rows, the values given to the auxiliary parameters are the same as the value read from the message, for example at an optional row a value (zero or one) indicating whether the message part corresponding to said text row is included in the message. Likewise, in the case of rows of the type CHOICE, SEQUENCE and SIZE(1 . . . N)OF, the same integer value that was obtained in the message can be given to the auxiliary parameter. On the other hand, for example for rows containing a mere parameter without any additional attribute, only the value zero or one, indicating whether said parameter or data structure is included in the message, is used for the auxiliary parameter. In principle, any value deviating from the initialization value and unequivocally indicating that the corresponding parameter or data structure is included in the message can be used for each auxiliary parameter. Thus, it is found by comparison of the auxiliary variable value whether said parameter has a fresh value (whether it was included in the message received), even though the text row of this type was surrounded by a multi-level (optional) data structure. If it is found in the comparison that the auxiliary parameter still has its initialization value, this is an indication of the fact that the parameter or data structure was missing from the message, for example for the reason that the surrounding data structure was omitted at the message transmitting end.

FIG. 9 shows an example in which the value one is updated for the auxiliary parameters corresponding to the first two rows (which are the same as the values received in the message) and the value four (the same as the value received in the message) is updated for the auxiliary parameter corresponding to the next row. Thereafter the reading logic hops to the fourth data structure (SEQUENCE-type row) the auxiliary parameter corresponding to which receives the value one in this exemplary case. At the next CHOICE type row, the logic hops to the data structure that is included in the message. This data structure is the second of five structures at the same level, and consequently the last three rows at that level are skipped, which gives the row (numOfRepet) that is at a level having the second row (SEQUENCE) from the top in the figure as a header. The logic also skips the four last rows in the figure and leaves the auxiliary parameters corresponding to them unupdated, since the last SEQUENCE-type row in the figure and the last row in the figure (displayinfo) are at the same level as the second row (SEQUENCE) from the top in the figure and since the value one corresponded to the row CHOICE heading them (which meant that only the first of the data structures at said level is included in the message).

Figure 10:
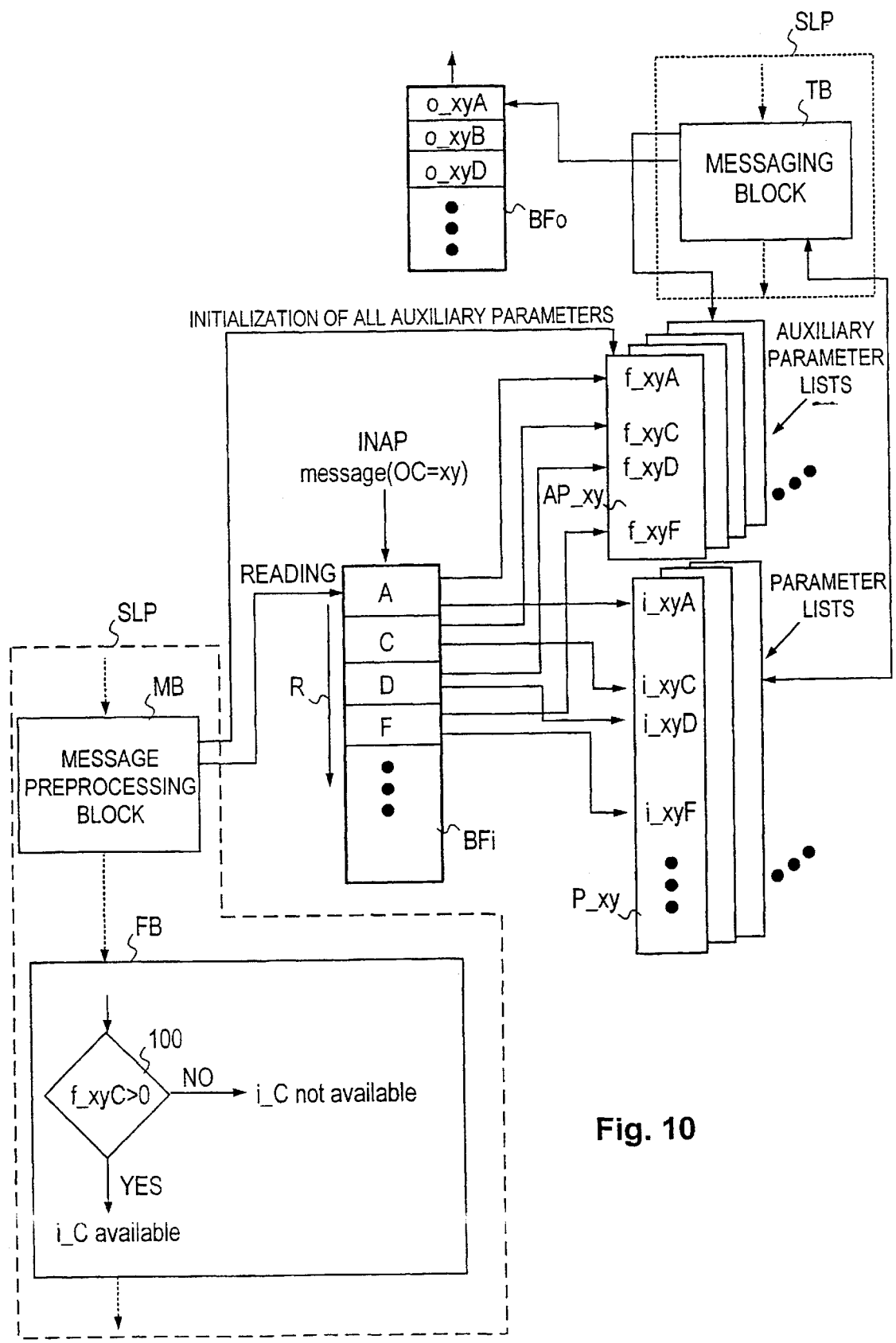
FIG. 10 illustrates updating of parameters and auxiliary parameters carried out in the network element on the basis of the receipt of a data message.

FIG. 10 illustrates the processing of a data message carried out by the service logic program. It is assumed in the example that an incoming message (having an operation code OC=xy and having text rows A, B, C, D etc. in its ASN.1 message definition) is stored in an incoming message buffer BFi. It is further assumed in the example that the received message has data fields corresponding to rows A, C, D, F etc. of the message definition (i.e., at least B and E are missing from in between).

Initially, the message preprocessing block MB initializes all auxiliary parameters in the auxiliary parameter list (AP_xy) corresponding to said message type to the value zero. Thereafter the message preprocessing block reads from memory the initial address of the message buffer BFi and starts reading the content of the buffer in order (indicated by arrow R), beginning with the initial address. At row A, the message preprocessing block updates the corresponding auxiliary parameter (f_xyA) and stores in the parameter list P_xy corresponding to said message the value that was received in the message for the parameter (i_xyA) corresponding to said row. The parameters in the parameter list are different data types depending on which type (integer, BCD etc.) said parameter has. After this, the updating logic skips row B and updates the auxiliary parameter corresponding to row C (f_xyC) and stores the value that was received in the message for the parameter (i_xyC) corresponding to said row. In this way, the reading proceeds towards the end of the message buffer. Only those auxiliary parameters that relate to text rows the part corresponding to which is included in the message are updated to a new value.

When the service logic program later reaches e.g. function block FB that processes the information included in the message, it must be checked in said block whether a given parameter has been included in the message (that arrived last). For example, if it is to be checked whether the part corresponding to text row C in the message definition was included in the message, a simple test (reference numeral 100) is performed within the function block FB testing whether the auxiliary parameter f_xyC corresponding to said row is greater than zero. If this is the case, the parameter (i_xyC) is available. In other cases, it is known that said parameter was not included in the message.

The above describes the use of auxiliary parameters mainly in the message reception direction. In the transmission direction, the meassaging blocks TB read the auxiliary parameter list corresponding to the type of message to be sent and write into the outbound message buffer BFo, from the parameter list of said message, the data for which the values of the corresponding auxiliary parameters differ from their initialization values. Prior to this, the earlier blocks (e.g. the function blocks FB) of the service logic program have given to the auxiliary parameters values indicating to the messaging block what parameters are included in the message. A comparison of the above kind must thus be performed in the messaging block, checking whether the auxiliary parameter has its initialization value or a value deviating from that value. Only the parameters having a value differing from the initialization value are included in the message to be sent. The logical format of the comparison is only dependent on the type of the row representing the data that is being written into the outgoing message buffer.

On the other hand, the comparison is in no way dependent on the remaining, surrounding structure of the message.

The network element can also be implemented in "stripped" form, so that parts corresponding to some rows in the message definition are not implemented at all. In that case, the decoding routine included in the message preprocessing block, the task of which is to fill the incoming message buffer, does not identify the message parts corresponding to said rows and they are not stored in the message buffer even if they have arrived in the message. In this case, the auxiliary parameters corresponding to said text rows can be initialized to a negative value, e.g. to the value−1, indicating that said network element does not identify the corresponding parameters or data structures at all. When even a non-implemented row is associated with an auxiliary parameter having a dedicated value, the control of the logic for these rows is simple and the same blocks can be used in the network elements irrespective of whether they contain non-implemented rows. In this way, moreover, a limitation profile indicating what kind of subset of an INAP message set the network element uses in exchanging messages with a given second network element can be easily defined. These limited messages can be used e.g. over the connection between the SCP network element and the assisting SCP network element referred to at the beginning. Such a function for parameter-related limitation of INAP messages is called by the English term INAP screening.

Even though the invention has been described in the above with reference to the examples in accordance with the accompanying drawings, it is obvious that the invention is not to be so restricted, but it can be modified within the scope of the inventive idea set forth above and in the appended claims. The idea can also be utilized in such a way that a dedicated auxiliary parameter is formed for some of the text rows only, even though it is preferable in view of facilitating the checks that there is an auxiliary parameter for each text row of the message definition. Neither is the application environment of the invention limited to an intelligent network, but it can be used in any environment in which the circumstances are similar, i.e. messages having a multi-level structure are received and it must be checked which information is included in the message. The definition language used can also be different in another application environment.

What is claimed is:

1. A method for processing a data message in a network element of a communications network, in accordance with which method messages whose structure is defined by means of a given description language, the message definition of an individual message type comprising several successive components, such as text rows, are sent to the network element in the communications network, characterized by tying an auxiliary parameter (f_xyA . . . f_xyF) to an individual component of the message definition of an individual message type, maintaining in the network element a value for the auxiliary parameter, said value indicating whether the message part corresponding to said component is included in the message to be processed.

2. A method as claimed in claim 1, characterized in that there is a dedicated set of auxiliary parameters (AP_xy) for each message type to be sent from the network element to the network and for each message type to be received from the network in the network element.

3. A method as claimed in claim 1, characterized in that there is a dedicated auxiliary parameter for each component in the message definition of an individual message type.

4. A method as claimed in claim 1, characterized in that integer values are used for the auxiliary parameters.

5. A method as claimed in claim 4, characterized in that prior to the processing of a message to be transmitted or received, the auxiliary parameters of said message type are initialized to their initialization values.

6. A method as claimed in claim 5, characterized in that processing of message parts relating to certain components is left totally unimplemented in the network element, the auxiliary parameters corresponding to said components being initialized to an initialization value differing from the initialization values of the auxiliary parameters corresponding to rows associated with message parts the processing of which has been implemented.

7. A method as claimed in claim 6, characterized in that by means of the auxiliary parameter values, a limitation profile is formed in the network element indicating what kind of subset of a message set is used in the message exchange between said network element and a given second network element.

8. A method as claimed in claim 1 in an SCP network element of an intelligent network, characterized in that the values of the auxiliary parameters are maintained by means of the service logic programs (SLP) included in the network element, and that the service logic programs comprise a generic message preprocessing block (MB) for each message type to be received, said block transferring the data received in the message to the use of the service logic programs and updating the values of the auxiliary parameters.

9. A method as claimed in claim 5 in an SCP network element of an intelligent network, characterized in that the values of the auxiliary parameters are maintained in service logic programs (SLP) included in the network element, said programs comprising a generic messaging block (TB) for each message type to be transmitted, said block constructing the message to be transmitted by writing into the message only the data the values of the auxiliary parameters corresponding to which differ from their initialization value.

10. A network element arrangement in a communications network which comprises a plurality of network elements and in which messages whose structure is defined by means of a given description language are sent from one network element to another, the definition of an individual message type comprising several successive components, such as text rows, said network element arrangement comprising means for transmitting and receiving messages passed in the network, and means for storing the information contained in the message in the network element, characterized in that auxiliary parameters relating to the components of the description language used are stored in the network element, and that the arrangement comprises means (SLP, MB, TB) for maintaining the auxiliary parameters, so that their values indicate whether the message part corresponding to an individual component is included in the message to be processed.

11. A network element arrangement as claimed in claim 10, characterized in that an auxiliary parameter set (AP_xy) for each message type to be sent from the network element and for each message type to be received from the network in the network element is stored in the network element.

12. A network element arrangement as claimed in claim 10, characterized in that an individual auxiliary parameter set stores an auxiliary parameter for each component in the message definition.

* * * * *